E. C. BRICE & R. N. HUDSON.
APPARATUS FOR GENERATING ELECTRICITY.
APPLICATION FILED MAR. 29, 1910.
989,892.
Patented Apr. 18, 1911.
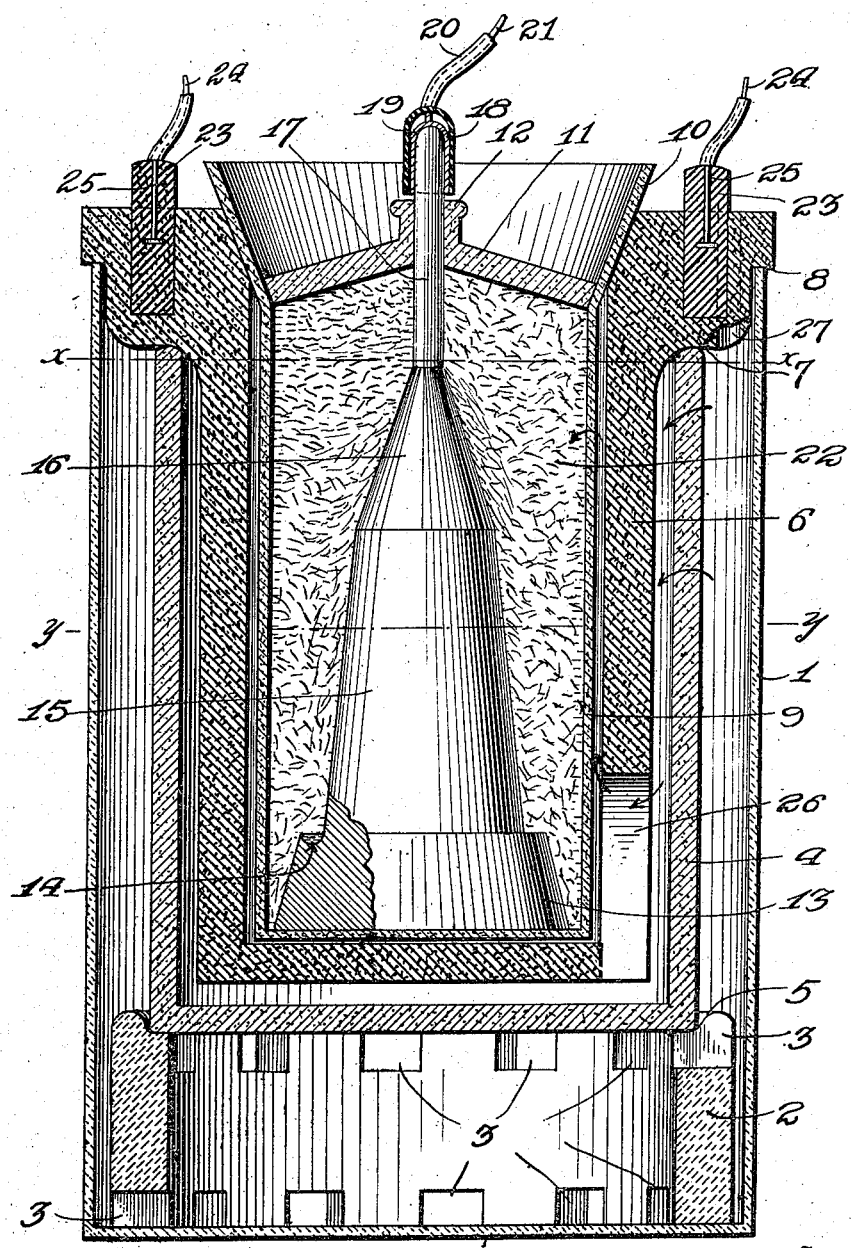
Witnesses
C. Everett Lancaster.
Jno. L. M<sup>c</sup>Cathran.
Inventors
Edward C. Brice,
and Richard N. Hudson,
By E. E. Vrooman
Attorney.

UNITED STATES PATENT OFFICE.

EDWARD C. BRICE AND RICHARD N. HUDSON, OF LEXINGTON, KENTUCKY.

APPARATUS FOR GENERATING ELECTRICITY.

989,892.
Specification of Letters Patent. Patented Apr. 18, 1911.
Application filed March 29, 1910. Serial No. 552,156.

*To all whom it may concern:*

Be it known that we, EDWARD C. BRICE and RICHARD N. HUDSON, citizens of the United States of America, residing at Lexington, in the county of Fayette and State of Kentucky, have invented certain new and useful Improvements in Apparatus for Generating Electricity, of which the following is a specification, reference being had therein to the accompanying drawing.

This invention relates to apparatus for generating electricity by chemical means, and has for its object to provide an improved apparatus of this kind to be used for light and power purposes, and by means of which great efficiency, as well as economy, is obtained.

One object of the invention is to provide an improved apparatus of this kind by means of which the chemical action is increased and greater electric power is obtained, both in voltage and amperage.

Another object of the invention is to provide an improved apparatus of this kind, by means of which the life of the apparatus is prolonged with a small loss of active material.

Another object of the invention is to reduce the electrical resistance and increase the efficiency of the apparatus.

Another object of the invention is to provide an improved apparatus of this kind that by increasing or decreasing its size and the density of the material employed in the porous cups a uniform flow of current can be obtained for a definite period without requiring attention or a renewal.

Another object of the invention is to provide a new composition of matter which is employed as an electrolyte in the apparatus.

Another object of the invention is to provide a metallic conductor located within the exciting fluid contained in the porous cup of the apparatus that will not be decomposed in generating electricity, as is the case in other forms of batteries.

In batteries now in use, the zinc-electropositive element is used both for generating the current and as a conductor, and as the zinc is dissolved, its power of generating and conducting electricity is proportionately reduced. Hence, from the beginning of the action of the battery, the power is continually decreasing until the battery is exhausted. In the apparatus hereinafter described, the conductor is protected from the action of the fluid in the porous cup by keeping the conductor at all times heavily amalgamated with mercury, and therefore is used only as a conductor and not as active agent, the amalgamated zinc fragments alone being decomposed and employed to produce the current.

Referring to the accompanying drawings,—there is shown in vertical section an electrical apparatus constructed in accordance with this invention.

In carrying out the invention there is employed a jar 1, of vitreous material, in the bottom of which rests a ring 2, of vitreous material having its upper and lower edges formed with openings, 3, the outer side of the ring 2 being slightly spaced from the inner side of the jar 1. An outer porous cup, 4, rests on a curved shoulder, 5, of the upper edge of the ring 2. The carbon conductor, 6, which is in the shape of a cup or cylinder, is suspended within the outer porous cup 4, and is supported by means of a curved flange, 7, which rests on the upper edge of the porous cup 4, and also by means of a shouldered portion, 8, of the flange 7, which rests on the top of the jar 1. Seated within the carbon conductor 6, which is in the form of a cup or cylinder, is a thin porous cup, 9, the carbon conductor 6 being slightly spaced from the inner wall of the porous cup 4, and the inner porous cup 9. The porous cup 9 is seated within the carbon conductor, 6, and has its upper end formed with an outwardly flaring portion, 10, which is seated in the correspondingly shaped portion of the upper end of the carbon conductor 6. Tightly seated within the upper end of the porous cup 9 at the lower end of the flaring portion 10 thereof, is a removable cover, 11, having a perforated knob or handle, 12.

Located within the thin porous cup 9 is a large metallic conductor formed with the enlarged frusto-conical base portion, 13, which rests on the bottom of the thin porous cup 9 and nearly covers the same and has on its top the annular gutter, 14, from which extends vertically the tapering main body portion, 15, of the conductor, a d then projects upward from the main body portion 15 with the diminishing cone-shaped portion, 16, from which extends in turn the rod-shaped vertical portion, 17, projecting through and above the button or handle 12 of the cover 11. Fitting over the upper end of the projection 17 is a cup or thimble, 18, inclosed by a thimble 19 of hard rubber. Secured in any suitable manner to the cup or thimble 18 and extending through the rubber thimble 19 and through an insulated coating, 20, are a number of lead wires, 21, which may be four in number or less. The thin porous cup 9 is filled with metallic fragments, 22, composed of amalgamated zinc and mercury, which surrounds the metallic conductor. The line $x$—$x$ extending across the apparatus indicates the height of the electrolyte in the jar 1, porous cup 4, carbon conductor 6, and wall of porous cup 9. The arrows indicate the course the fluid takes in its flow to porous cup 9. The line $y$—$y$ indicates the height of the water in the porous cup 9.

Mounted in the top of the carbon conductor 6 are carbon connecting plugs, 23, there being four of such plugs, or a less number may be used. The carbon plugs 23 are preferably secured to the carbon conductor 6 by being inserted in sockets in the flange 7 thereon. These carbon-connecting plugs are necessary, as a metal connection will corrode from the action of the acid vapor rising when the apparatus is in action. An insulated copper or lead wire, 24, is connected to the carbon plug 23 by means of an anchor 25, embedded in plug 23 before baking. As indicated by the arrows, the flow of the electrolyte is carried through the walls of the porous cup 9 by the force of gravity, intensified by the electric current to the water.

In carrying out this invention, there is employed as an electrolyte for the apparatus described a new composition of matter, which is used in jar 1, porous cup 4, around carbon conductor 6 and porous cup 9, and it is first placed in the bottom of jar 1. This new composition of matter is produced as follows: Take 1360 grams of common salt sodium chlorid, 227 grams of sulfuric acid, 66 degrees Baumé, and mix until the mass has ceased foaming, then add 227 grams of nitric acid, (36 degrees Baumé.) We further employ with the apparatus described 907 grams of amalgamated zinc in fragmentary form that is placed in porous cup 9 around the conical metallic conductor therein, filling the cup up to the cover. This amalgam is formed as follows: Take 8 grams of zinc in fragments, and 1 gram of mercury. Add to this 1 gram of muriatic acid. Stir the mass until a complete amalgamation is formed. This amalgam may also be formed as follows: Take 4800 grams of distilled water; dissolve in this 240 grams of bi-chlorid of mercury; place in this bath 3360 grams of metallic zinc and let it rest for two hours. We do not limit ourselves to the proportion stated herein, as more or less may be used with good results.

The reactions that take place upon the mixture of sodium chlorid, sulfuric acid and nitric acid are as follows: The sulfuric acid reacts with a certain amount of the sodium chlorid forming sodium sulfate and acid sodium sulfate, $Na_2SO_4$, and $NaHSO_4$. The addition of nitric acid after the sulfuric acid has been substantially exhausted, results in the production of some hydrochloric acid and a corresponding quantity of sodium nitrate. The composition of matter would thus consist of a mixture of sodium chlorid, neutral and acid sodium sulfate, sodium nitrate with small quantities of sulfuric, nitric and hydrochloric acids. At this point the vessel containing the mixture is closed with a loose cover. The sulfuric acid prevents the formation of any chemical union between the nitric acid and the sodium sulfate and sodium chlorid; a mechanical union which is desired is obtained, the nitric acid saturating the sodium salts and if the mixture is left at rest it will harden into a crusty mass and can be broken up and used as desired. The sodium chlorid should be perfectly dry when used. It is well known that, when sulfuric acid is mixed with a small amount of water, or a substance containing water in the form of moisture, great heat is generated. This is to be avoided, the more heat generated in the process, the greater will be the decomposition of the sodium chlorid, which is undesirable. When this mixture is placed in the cell jar and water is added in the proportion stated in the specification, a part of the sulfuric and all of the nitric acids which, as above stated are mechanically mingled with the sodium salts, becomes active forming a compound acid solution that acts upon the free sodium chlorid, evolving hydrochloric acid (while the nitric acid acts as a depolarizing agent) this acid passes through the pores of the inner porous cup, uniting with the water contained therein and is used as the exciting fluid upon the amalgamated fragments. There are no peroxids of nitrogen evolved after the crystallized electrolyte has been placed in water. The reasons for the use of this electrolyte in coöperation with the apparatus are as follows:—

1st. A powerful depolarizing agent containing in combination the exciting fluid.

2d. The sodium chlorid being in excess maintains a dense saturated solution which is required in our apparatus, the fluid being required to be a high conducting power.

3d. It was found in practice that an electrolyte composed of nitric and muriatic acids gave good results, but would be exhausted after 15 days' continuous use. The new composition of matter gives better results and remains active as long as any of the sodium chlorid is undissolved in the jar.

4th. It was found that the shipment of nitric and muriatic acids in carboys involved a high freight rate and that inexperienced persons would not handle these acids in charging the apparatus, the new composition being in crystallized form taken at a lower rate, can, and is handled by inexperienced persons without danger.

5th. The apparatus is going into domestic use for lighting and power purposes, running sewing machines, etc., where women are usually required to attend to same, and women will not handle radical acids, but will handle this new composition, as it is harmless as far as its acid nature is concerned.

In setting up the apparatus, take 1814 grams of the new composition of matter, and place the matter in jar 1, and add 2268 grams of water, stirring the mass a short time. Place the vitreous ring 2 in the bottom of jar 1, settling it firmly, and by a little shaking the undissolved electrolyte will permit the ring to become seated on the bottom of jar 1. On the ring 2 place the outer porous cup 4, which will cause the fluid electrolyte to rise to the acid line $x$—$x$. Place 454 grams of the filtered electrolyte in porous cup 4. Fill the porous cup 9 with muriatic acid and let it remain until the acid flows through the wall showing moisture on the outside. Then pour the remaining acid out of the cup 9, which will be found to have absorbed about 155 grams more or less accordingly as the cup has been burned hard or soft. Then place the metallic conductor in the porous cup 9, which may be made of either copper or zinc and which has its entire surface heavily amalgamated with mercury to protect it from corrosion from the acid solution which is formed in the cup 9. The gutter 14 collects and holds the metallic mercury set free by the decomposition of the amalgamated fragments 22 which are used as a charge about the metallic conductor. 227 grams of water is then placed in the cup 9 filling the same to the water lines $y$—$y$. The cover 11 is then put in place with the projection 17 extending through the same. The porous cup 9 containing the charge is placed in the carbon receptacle 6, which has been previously subjected to a bath of muriatic acid. It is necessary to have the pores of the carbon conductor 6 filled with acid before it is placed in the electrolyte, thus preventing the absorption of any sodium sulfate that may be held suspended in the electrolyte in the porous cup 4. The soda, if any, is held suspended, and will be absorbed into the pores of a dry carbon and reduce the conducting power of the carbons. The carbon conductor 6 is provided with a slot, 26, to allow the electrolyte to circulate around the porous cup 9. The carbon conductor 6 containing the porous cup 9 is then placed in the outer porous cup 4, causing the fluid electrolyte to rise to the acid line $x$—$x$. The carbon connecting plugs 23 are then inserted in their sockets in the carbon conductor 6. The copper thimble 18 containing the lead wires 21 is placed on the projection 17 with the rubber covering 19 over the copper thimble 18, and the apparatus is ready for use.

When the apparatus is set up and the circuit is closed, the reactions that will take place are as follows: The acid in the pores of the center porous cup 9 unites with the water, forming a weak acid solution. This solution acts upon the amalgam starting the current to flow, which increases the action of the diluted sulfuric acid on the chlorid of sodium, setting free hydrochloric acid, which flows by gravity, aided by the current, through the walls of the outer porous cup 4, the fluid being filtered thereby and delivered free of all undissolved particles to the space between the inner walls of the porous cup 4 and the outer walls of the carbon receptacle 6. From this space the fluid is forced by gravity through the slot 26 in the carbon conductor 6 to the space between the inner walls of the carbon receptacle 6 and the outer wall of the cup 9. From this space the fluid flows by seepage through the walls of the porous cup 9 into the water contained therein, increasing the acidity, intensifying the action on the amalgamated fragments, and increasing the current in amperes. This increase continues until the fluid in cup 9 has reached a level with the fluid contained in the jar 1 and the porous cup 4. The current thereafter, both in voltage and amperage will remain stationary for 24 hours on a closed circuit, when the amperage will begin to fall. The copper thimble 18, with its lead wires 21, is then removed from the porous cup 9, which has been taken out of the carbon receptacle 6, the top 11 having been removed from the cup 9, and the exhausted fluid poured off. If a great number of units of this apparatus are in use, the fluid can be saved and the chlorid of zinc recovered. The loss from the zinc fragments will be about 11 grams, which is replaced and the cup filled to the water line $y$—$y$ with water. The loss of the fluid electrolyte in jar 1 will be about 180 grams. This is replaced by adding 135 grams of water, 22.5 grams of sulfuric acid, 22.5 grams nitric acid through an opening, 27, in the flange 7 of the carbon conductor 6. The porous cup 9 is placed back in the apparatus as hereinbefore described. The copper thimble 18 is placed on the projection 17 and the apparatus is again ready for use.

It will be understood that the above renewal is necessary, provided the apparatus has been in constant use on a closed circuit for 48 hours. It is further understood that this apparatus is built for constant use and hard service, running motors of any size, and lighting houses.

By removing the exhausted fluid in the porous cup 9 at stated times, not longer than 48 hours between the same, the deposit of salts, and the formation of incrustations on the surfaces of the porous cup 9 and the metals is prevented.

Muriatic acid and nitric acid being the equivalent of the new composition of matter, can be used in this apparatus. The new composition of matter is preferably employed, as it is in solid form when handled and shipped. There is no danger in handling it. Furthermore, it is more economical, being one-fourth the cost of the two acids mentioned. It is found in practice that moisture from the electrolyte is drawn to the positive pole of the apparatus and accumulates therein, and if the ordinary connections are used, the connecting bolt, washer, jam nut and wire, corrode, increasing the resistance and lowering the efficiency of the apparatus, said parts, having to be frequently dried and the metal connections removed and cleaned. The carbon connecting plugs 23 overcome this trouble. When a plug 23 has accumulated moisture and refuses to act, it can be removed and a new plug inserted in its place while the old plug is drying. The flared top 10 of the cup 9 serves to tightly wedge the cover 11 in place, and at the same time permits the cup 9 to be readily removed.

To renew the apparatus, the connecting plugs 23 and the copper thimble 18, with the lead wires 21, and the conducting wires 24, are removed. The carbon receptacle 6 containing the porous cup 9 is taken out of the porous cup 4. The porous cup 4 is removed from the jar 1, and the exhausted fluid poured out. The cup 4 is immersed in water, to remove the sediment that is formed on its surfaces. The cup 9 is taken out of the carbon receptacle 6 and also immersed in water to remove any salts that may adhere to its surfaces. The exhausted electrolyte is poured out of jar 1. A charge of the new composition of matter is placed in jar 1, and water is added in the proportion heretofore specified. Porous cup 4 is charged with filtered electrolyte in the proportion heretofore set forth and returned to jar 1, resting on and being supported by the ring 2. The cover 11 is then removed from the porous cup 9, the metallic conductor carefully taken out, bringing with it the undecomposed zinc fragments, the conductor being retained in an upright position until the adhering fragments are removed. The metallic mercury that has collected in the gutter 14 is then poured out and saved, and the porous cup 9 filled with water and set aside. The metallic conductor is placed in another cup that has previously absorbed muriatic acid or filtered electrolyte. The amalgamated zinc fragments are added to fill the cup 9. The cup 9 is then filled with water to the line $y$—$y$, and the cover 11 is replaced. The cup 9 containing the completed charge is replaced in the carbon receptacle 6. If it is a new carbon, it is first placed in a bath of nitric acid to fill the pores, and will absorb about 250 grams, otherwise the electrolyte carrying a salt, will enter the pores of the carbon, and drying after the change is made, the salt will crystallize in the pores, reducing the conducting power of the carbon. Carbons that have once been used and not allowed to dry need not be so treated. Both the cup 9 and the carbon receptacle 6 are then placed in the porous cup 4, which has previously been placed in the jar 1. The carbon plugs 23 and the copper thimble 18 are placed in position, and the apparatus is ready for use.

It is necessary to at all times maintain a strong, filtered solution of the electrolyte, free of all foreign undissolved matter, around the carbon conductor 6 and the outer wall of the porous cup 9 in order to maintain a high ampere current. This is accomplished by charging the apparatus with more of the new composition than the water will dissolve. The space within the ring 2 holds this excess, while a weaker solution is required in the porous cup 9, which surrounds the amalgamated metals to prevent local action. If the solution in the cup 9 had the same density as that contained in the jar 1 and porous cup 4, there would be an unnecessary waste of metals. Hence the necessity of changing the fluid in the cup 9 oftener than the fluid in the jar 1 and the porous cup 4, which fluid need not be changed more than once in two months when in constant use, provided that a solution composed of water 135 grains, sulfuric acid 32.5 grams, and nitric acid 22.5 grams, be added through the opening 27 in the flange 7 of carbon conductor 6. To maintain the height of this fluid at the acid line $x$—$x$, this addition should be made at the same time that water is added to the porous cup 9, as hereinbefore set forth.

By means of this apparatus, constructed and arranged as herein set forth, a new and improved powerful cell is provided with great efficiency to run, when the units are connected in series, all sizes of low voltage motors, and for lighting houses.

If nitric and muriatic acid, are used, the porous cup 4, may be omitted, as these acids are usually free from all foreign undissolved matter.

It will be understood that the fluid electrolyte, free of all undissolved matter, can be used in the main jar 1 without the porous cup 4 and the ring 2, the ring 2 being used only as a support or which the porous cup 4 rests. The cup 4 is only used as a filter.

Having described the invention, we claim as follows:

In an apparatus of the character described, a jar, an apertured support resting on the bottom of said jar and spaced from the sides thereof, an outer porous cup resting on the top of said apertured support, a carbon conductor receptacle suspended within said porous cup and resting on the top of the same and on the top of the jar, a thin porous cup suspended within said carbon receptacle, a detachable cover closing the same, a metallic conductor consisting of a vertical solid body resting on the bottom of said thin porous cup and having a projection at its upper end extending through the cover of said cup, and leading wires detachably connected with said projection.

In testimony whereof we hereunto affix our signatures in presence of two witnesses.

EDWARD C. BRICE.
RICHARD N. HUDSON.

Witnesses:
JESSE G. HUDSON,
MARSHALL FOLEY.

Copies of this patent may be obtained for five cents each, by addressing the "Commissioner of Patents, Washington, D. C."